No. 674,902. Patented May 28, 1901.
M. CAHEN.
STUFFING BOX PACKING FOR COLD WATER PUMPS.
(Application filed May 12, 1900.)
(No Model.)
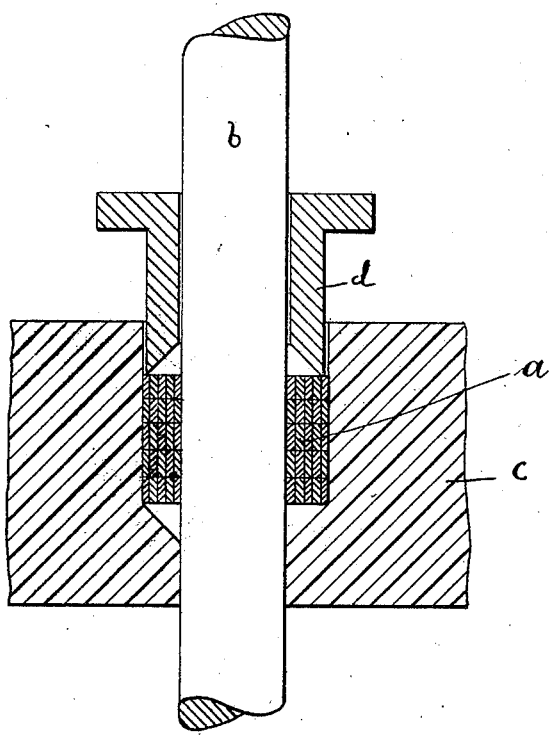

United States Patent Office.

MARCUS CAHEN, OF MÜLHEIM, GERMANY.

STUFFING-BOX PACKING FOR COLD-WATER PUMPS.

SPECIFICATION forming part of Letters Patent No. 674,902, dated May 28, 1901.

Application filed May 12, 1900. Serial No. 16,512. (No model.)

*To all whom it may concern:*

Be it known that I, MARCUS CAHEN, manufacturer, a subject of the Emperor of Germany, and a resident of No. 66 Regentenstrasse, Mülheim-on-the-Rhine, in the Empire of Germany, have invented a certain new and useful Improved Stuffing-Box Packing for Cold-Water Pumps, of which the following is an exact, full, and clear description.

This invention relates to an improved stuffing-box packing which consists of strips or pieces of animal-skin sewed together or united in any other suitable manner, such skin having undergone a special treatment in order to become so porous and capable of receiving lubricating material that the packing can be termed "self-lubricating."

The accompanying drawing shows a longitudinal section of a stuffing-box with the packing $a$ produced according to the present process, the shaft or rod being indicated at $b$, the wall through which it passes at $c$, and the packing-confining ring or sleeve at $d$, these latter parts being of the ordinary or any desired construction.

After the usual cleaning and preparation the animal-skin is put into a bath of castor-oil or other suitable oil for a sufficient period, so as to thoroughly impregnate the skin with such oil. The excessive or surplus oil is removed by packing the skin in sawdust, infusorial earth, or any other absorbing material. The skin, which is thus thoroughly impregnated with oil, is then subjected to a weak chrome-tanning process for a longer period in order to be rendered resistible, and finally dried. Such prepared skin from which packing-strips are made has the advantage of being very porous and having a great resisting force against wear and tear and is specially adapted for packings, in that it neither shrinks nor becomes hard and exerts a lubricating action on the parts carried by the packing.

The leather used hitherto for packings is specially unadapted for stuffing-box packings, because tanned leather becomes hard and shrinks, and for this reason the packings provided with such leather become loose. Alum-leather affects the metal parts of the packing too much, and leather dressed with oil has too little resisting force and is also too hard and brittle for producing packings adapted to be utilized for a longer period. For this reason combined materials have hitherto generally been used for stuffing-box packings, which, according to experience, rapidly wear out, so that it is necessary to frequently replace the same, which causes loss of time and expense.

Having now particularly described and ascertained the nature of the said invention, I declare that what I claim, and wish to secure by Letters Patent, is—

1. The improved process of making leather stuffing-box packing, comprising cleaning the skins or hides, impregnating the same with oil, eliminating surplus oil, then subjecting the same to a weak chrome-tanning process, and then cutting the hides or skins into strips and uniting the strips.

2. A stuffing-box packing comprising a series of united strips of hide or skin which have been previously impregnated with oil and subjected to a weak chrome-tanning process.

In witness whereof I have hereunto set my hand in presence of two witnesses.

MARCUS CAHEN.

Witnesses:
H. WERNER,
W. WIESEL.